Sept. 13, 1938.   G. H. JOHNSON   2,129,935
CYCLE SLED
Filed July 28, 1936   2 Sheets-Sheet 1
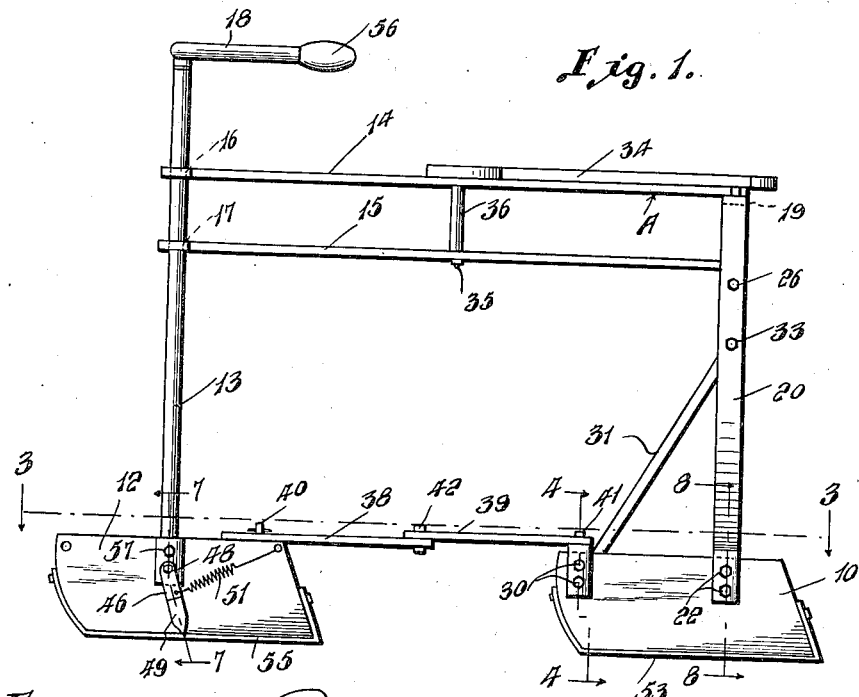
Fig. 1.
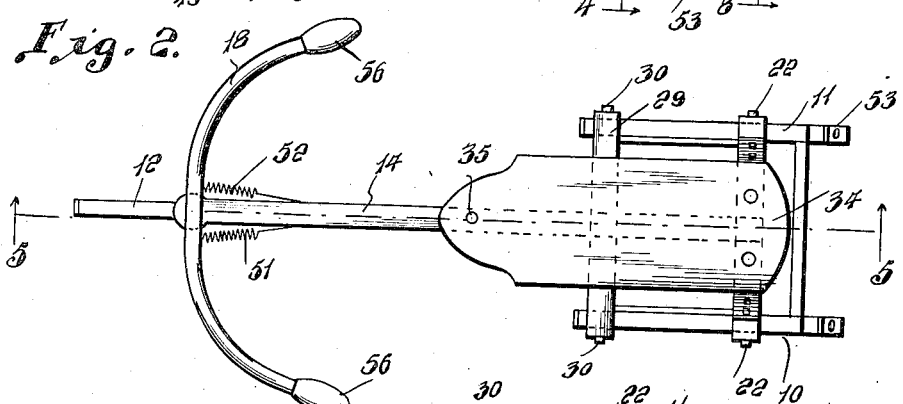
Fig. 2.
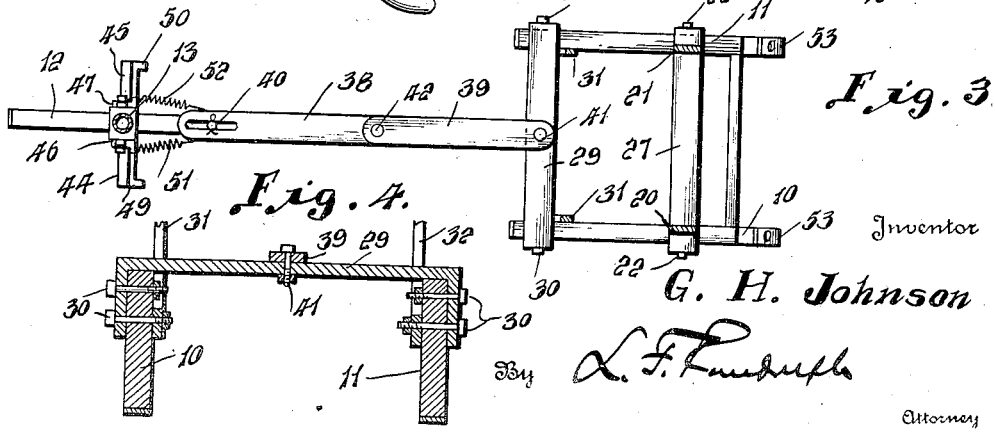
Fig. 3.
Fig. 4.
Inventor
G. H. Johnson Sept. 13, 1938.  G. H. JOHNSON  2,129,935
CYCLE SLED
Filed July 28, 1936  2 Sheets-Sheet 2
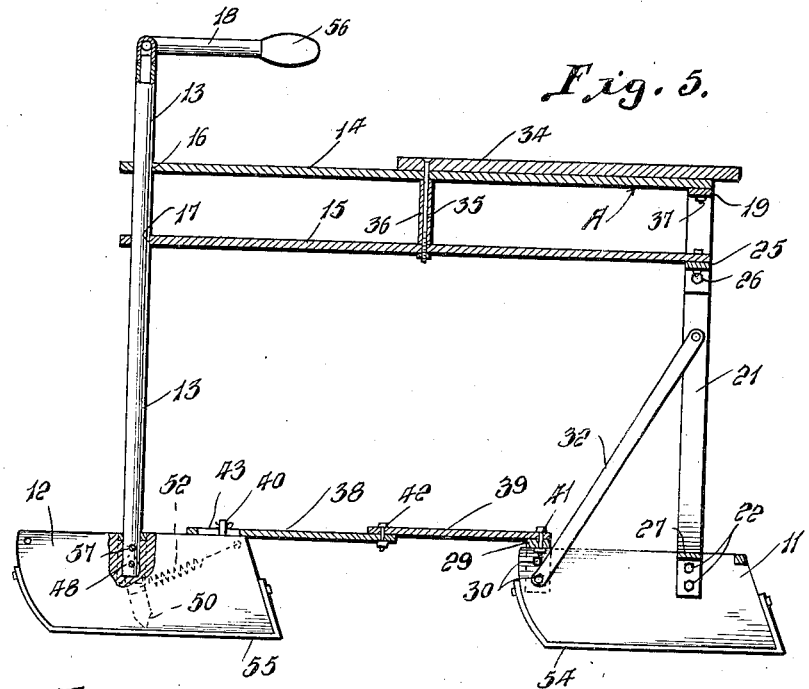
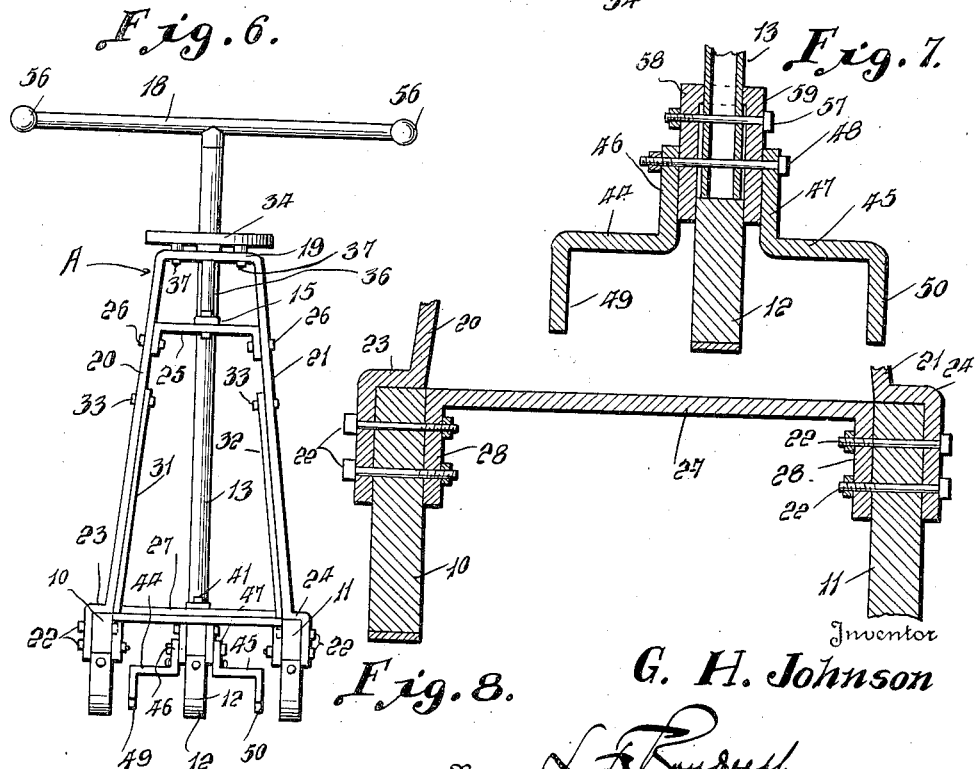
Inventor
G. H. Johnson Patented Sept. 13, 1938

2,129,935

UNITED STATES PATENT OFFICE 2,129,935

CYCLE SLED

Gus H. Johnson, McKeesport, Pa.

Application July 28, 1936, Serial No. 93,076

3 Claims. (Cl. 188—8)

This invention relates to coasting sleds.

The principal object of the invention is to provide a sled to be used upon snow and ice that will operate upon runners and be ridden as a bicycle.

Other objects and advantages of the invention will become apparent from the drawings and the following description.

In the drawings:—

Figure 1 is a view in side elevation of the coasting sled;

Figure 2 is a top plan view of the same;

Figure 3 is a horizontal sectional view on the line 3—3 of Figure 1;

Figure 4 is a cross sectional view on the line 4—4 of Figure 1;

Figure 5 is a longitudinal sectional view on the line 5—5 of Figure 2;

Figure 6 is a view in rear elevation;

Figure 7 is a view in cross section on the line 7—7 of Figure 1, and

Figure 8 is a view in cross section on the line 8—8 of Figure 1.

Referring more particularly to the drawings wherein like reference characters designate like or corresponding parts in the different views, 10 and 11 are the rear runners of said sled.

A steering runner 12 supports a steering column 13 which extends upwardly through openings 16 and 17 in the horizontal braces 14 and 15. Handlebars 18 are secured to the upper rod of the steering column 13.

A frame A is provided and has a horizontal brace 14 resting upon the supporting brace 19 which has downwardly extending legs 20 and 21 and are secured adjacent their lower ends to the runners 10 and 11 by means of bolts 22. The legs 20 and 21 are inclined downwardly and outwardly and have offset portions 23 and 24 which rest upon the upper edges of the runners 10 and 11.

A cross brace 25 is provided and has downturned ends which are secured to the legs 20 and 21 by means of bolts 26. The horizontal brace 15 is supported at one end by the brace 25. A cross brace 27 for the runners 10 and 11 has downturned ends 28 which are secured to the inner faces of said runners by means of the bolts 22.

Another brace 29 extends across the forward end of the runners 10 and 11 and has its ends turned down and secured by bolts 30 to said runners. The bolts 30 also secure the lower ends of diagonal braces 31 and 32 to the runners 10 and 11. Said braces 31 and 32 extend diagonally rearward and have their upper ends secured to the legs 20 and 21 by bolts 33.

A seat 34 rests upon the brace 14 and has its front end fastened to said brace by a bolt 35 extending through said brace, then through a spacing sleeve 36 and secured to brace 15. The rear end seat 34 is secured to the brace 19 by bolts 37.

The steering runner 12 is connected to the stationary runners 10 and 11 by the links 38 and 39. Link 38 is secured to runner 12 by bolt 40 and link 39 to the cross brace 29 by the bolt 41. The adjacent ends of links 38 and 39 are pivotally connected by a pin 42, and link 38 has a slot 43 therein in which pin 40 slides to allow for the turning movement of runner 12.

Foot rests 44 and 45 are provided and have upwardly extending ends 46 and 47 which are pivotally connected to runner 12 by means of a bolt 48. The opposite ends of the foot rests 44 and 45 are turned downwardly and pointed to form ground brakes 49 and 50. The ground brakes 49 and 50 are normally held in a raised position out of engagement with the ground by means of coil springs 51 and 52 that are terminally secured to opposite sides of the runner 12 and to said foot rests 44 and 45, respectively.

The runners 10, 11 and 12 have metal shoes 53, 54 and 55 fastened to their lower ground engaging edges. The handlebars 18 are provided with rubber grips 56.

The steering post 13 is secured in a socket 12ª in the runner 12 by means of bolts 48 and 57, and spacing plates 58 and 59 are secured on opposite sides of the runner and steering post by the bolts 48 and 57, said plates 58 and 59 spacing the upturned portions 46 and 47 from the runner 12.

In operation the rider straddles the horizontal bars 14 and 15 and sitting upon the seat 34 grips the handlebars 18 to steer the sled, having his feet resting upon the foot rests 44 and 45. To stop the sled the rider presses down on the inner edge of the foot rests 44 and 45 causing the pointed ends of the ground brakes 49 and 50 to be swung downward, against the action of the coil springs 51 and 52, and into engagement with the ground.

It is to be understood that the preferred embodiment only of the invention has been set forth, the right being reserved to make such changes and modifications as will not depart from the spirit and scope of the invention.

I claim as my invention:—

1. A coasting sled comprising a frame and runners, one of said runners being swivelly mounted and provided with pivoted members, said members normally forming foot rests, and being provided with ground engaging portions adapted to act as a brake.

2. A sled provided with a steering runner, brake members pivotally mounted on each side of said runner, said members comprising horizontal portions forming foot rests and downturned ends adapted to engage the contact surface, and said ends being normally held in a raised position by spring means.

3. In combination with a solid walled swivelly mounted steering runner, brake members pivotally mounted on each side of said runner, said members each having a horizontal portion forming a foot rest, a portion bent substantially at a right angle to said horizontal portion, said last mentioned portion being of sufficient length to engage the contact surface when in substantially a vertical position, and spring means connected to said last mentioned portion and to the runner to normally retain such ground engaging end in a raised position.

GUS H. JOHNSON.